United States Patent
Kim et al.

(10) Patent No.: US 7,084,002 B2
(45) Date of Patent: Aug. 1, 2006

(54) METHOD FOR MANUFACTURING A NANO-STRUCTURED ELECTRODE OF METAL OXIDE

(75) Inventors: Kwang Bum Kim, Gyeonggi-Do (KR); Kyung Wan Nam, Seoul (KR); Il Hwan Kim, Seoul (KR); Jin Ho Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 10/970,170

(22) Filed: Oct. 20, 2004

(65) Prior Publication Data

US 2005/0142898 A1 Jun. 30, 2005

(30) Foreign Application Priority Data

Dec. 30, 2003 (KR) .................. 10-2003-0099761

(51) Int. Cl.
*H01L 21/00* (2006.01)
*H01L 21/16* (2006.01)

(52) U.S. Cl. .............. 438/104; 438/85; 438/722
(58) Field of Classification Search ............. 438/104, 438/77, 85, 86, 105, 409, 722, 960
See application file for complete search history.

(56) References Cited

U.S. PATENT DOCUMENTS

| 4,472,533 | A | * | 9/1984 | Moskovits ............... 502/320 |
| 5,693,207 | A | * | 12/1997 | Fromson et al. ........... 205/112 |
| 6,129,901 | A | * | 10/2000 | Moskovits et al. ....... 423/447.3 |
| 6,828,054 | B1 | * | 12/2004 | Appleby et al. ............. 429/34 |

* cited by examiner

*Primary Examiner*—David Nhu
(74) *Attorney, Agent, or Firm*—Peter F. Corless; Edwards Angell Palmer & Dodge LLP

(57) ABSTRACT

The present invention relates to a method for manufacturing a nano-structured metal oxide electrode, and in particular, to a method for manufacturing a metal oxide electrode having a few tens or hundreds of nanometers in diameter that is well adapted to an electrode of a supercapacitor using an alumina or polymer membrane having nano-sized pores as a template. Preferred methods for manufacturing a nano-structured metal oxide electrode comprises steps of preparing an alumina or polymer template having a plurality of nano-sized pores; sputtering a metal acting as a current collector with a few tens of μm of thickness in one surface of the alumina template; charging the template, after the sputtering step, by submerging it into a precipitation solution having a metal salt dissolved therein, and applying a static current or electrode electric potential thereby electrochemically precipitating a metal oxide in the nano-sized pores of the template; a step in which the composite of the alumina or polymer template and the metal oxide are contacted with a sodium hydroxide solution or other base to remove the alumina or polymer template; and an optional drying step to provide the nano-structured metal oxide electrode.

16 Claims, 1 Drawing Sheet

METHOD FOR MANUFACTURING A NANO-STRUCTURED ELECTRODE OF METAL OXIDE

CROSS-REFERENCE TO RELATED APPLICATION

The present application claims the benefit of Korean Application No. 2003-0099761, which is incorporated by reference herein in its entirety.

FIELD OF THE INVENTION

The present invention relates to a method for manufacturing nano-structured metal oxide electrodes. More particularly, in preferred aspects, the invention relates to a method for manufacturing a nano-structured metal oxide electrode in which the metal oxide is deposited into the pores of a nano-porous template such that the nano-structured metal oxide comprises a plurality has a metal oxide structures which preferably have a diameter of between about 5 and about 500 nanometers. The nano-structured metal oxide electrodes are suitable for use as an electrode in a supercapacitor using anodic aluminum oxide (AAO).

BACKGROUND OF THE INVENTION

A portable battery with high performance is one of key elements used in producing finished products such as various mobile information communication instruments, electronic devices, and electric vehicles. The next generation type energy storing systems that have been developed in recent years have been making good use of the electrochemical principle; e.g., a Li-based secondary battery and an electrochemical capacitor.

The secondary battery is an efficient energy storage device in part because of the large amount of energy stored per unit weight or unit volume. However, development of secondary batteries continues in order to improve on run time, charge time, and the amount of energy stored per unit time (power density).

The energy density of the electrochemical capacitor is relatively small compared to that of the secondary battery, but the electrochemical capacitor offers superior running time, charging time, and power density compared to current secondary battery technology. Therefore, many studies have been conducted on electrochemical capacitors to provide increased energy density.

A super capacity electrochemical capacitor manufactured using an electrochemical principle is divided into two groups: an electrical double layer capacitor (EDLC) which utilizes the principle of an electrical double layer, and a supercapacitor capable of generating super capacity 10 times greater than that of the EDLC type due to pseudo-capacitance generated in an electrochemical faradaic reaction.

In EDLC, an active carbon fiber is used as an electrode active material of a capacitor, thus storing a high intensive electric charge in an electrical double layer, while the supercapacitor uses a metal oxide as an electrode active material. With the above high capacity and high power density, the supercapacitor may be well suited for the power of an electric vehicle, the power of a portable mobile communication instrument, the power of a memory backup of a computer, the power of a military/aerospace equipment, and the power of a small sized medical equipment.

The electrode material of the metal oxide can be considered the most important element in the supercapacitor formed of a metal oxide electrode, a separator, an electrolyte, a current collector and casing, and terminals.

Examples of metal oxide electrode materials that are suitable for use in supercapacitor applications include $RuO_2$, $IrO_2$, $NiO_x$, $MnO_2$, and the like.

Among the electrode materials discussed supra, $RuO_2$ is known to have the highest capacitance (720 F/g), but its use is very limited to aerospace, aircraft, military, and related industries, due in part to high materials cost. Certain other materials which have previously been investigated as a $RuO_2$ replacement, such as $NiO_x$, $CoO_x$, $MnO_2$, and the like, have a very low capacitance and are therefore not particularly suitable for use as a high capacity metal oxide in electrode applications.

It would be desirable to develop alternate, less expensive electrical materials having capacitances that are similar to or greater than the capacitance of $RuO_2$. It would also be desirable to provide electrodes and devices incorporating the use of said alternate electrical materials.

U.S. Pat. No. 6,129,901 discloses a method of producing metals containing carbon nanotube comprising: anodizing an aluminum substrate in an electrolytic cell for manufacturing an aluminum template having a plurality of pores, depositing an effective catalyst (selected from Co, Fe, Ni, alloys thereof) into the pores, and exposing the alumina template into a hydrocarbon gas at a temperature of 600~800° C. so that carbon nanotube is pyrolyzed in the pores. Here, the outer diameter of each carbon nanotube is smaller than the diameter of the pore in the templates.

In the method for manufacturing recited in the '901 patent, metal oxide powder fabricated by a sol-gel method and a chemical precipitation method is mixed with a conductive carbon, and the mixture is formed in a predetermined shape according to the current collector, thereby forming an electrode.

The preparation of the metal oxide powder is synthesized using the sol-gel method, a multi-step process comprising agitating, filtering, washing, drying, heat treatment, etc. is needed, thus requiring a long period of time for mixing metal oxide materials.

Further, in order to form a shape of an electrode using thus synthesized metal oxide powder, a certain amount of conductive carbon and binder should be mixed. Therefore, it is impossible to accurately judge electrochemical properties of a metal oxide, and a specific capacitance is decreased due to the presence of a binder and a conductive material in addition to an active material.

Thus, for at least the foregoing reasons, it would be desirable to provide a low-cost reproducible high-specific capacitance material for use in electrochemical capacitor applications. It would also be desirable to provide a method for making nano-structured electrodes of the low-cost reproducible high-specific capacitance material which are suitable for use in electrochemical capacitor applications.

SUMMARY OF THE INVENTION

The present invention provides methods for manufacturing a metal oxide electrode with a high specific capacitance which are suitable for use in various electrochemical applications, e.g., super capacitors and the like.

In a preferred aspect, the invention provides a fabrication method of a nano-structured metal oxide electrode having an array of metal oxide structures preferably having a smallest dimension of between 5 and about 500 nanometers. Preferred nano-structured metal oxide electrodes which are suitable for use as an electrode of a supercapacitor are prepared by a method which uses anodic aluminum oxide (AAO) as a template to form the nano-structured metal oxide electrode.

In certain aspects, the invention provides a method for manufacturing a nano-structured metal oxide electrode, comprising:

(i) preparing an alumina or polymer template having a plurality of nano-sized pores;

(ii) sputtering or otherwise applying a metal acting as a current collector having a thickness of a few tens of μm in one surface of the alumina or polymer template;

(iii) charging a template, after said sputtering, by inserting into a precipitation solution having a metal salt dissolved or otherwise dispersed therein, and applying a current or electrode electric potential;

(iv) electrochemically precipitating a metal oxide in the nano-sized pores of the template;

(v) contacting the alumina or polymer template and the precipitated metal oxide composite with a sodium hydroxide solution or other base under conditions conducive to removal of the alumina or polymer template to provide a nano-structured metal oxide electrode; and (vi) optionally drying the a nano-structured metal oxide electrode.

It can be preferred that the current collector is formed during a sputtering step and has a thickness of a few tens of μm (e.g., a thickness of about 1–100 μm, or more preferably a thickness of about 5–50 μm, or about 5, 10, 15, 20, 25, or 30 μm) in the sputtering step and has an excellent electrical conductivity, is stable during an electrochemical precipitation of the metal oxide and is chemically and electrochemically stable in the solution of the metal solution.

In certain preferred methods, the metal salt dissolved in the precipitation solution is a nickel salt.

In the step of applying a current or voltage, a current density of a few tens or few hundreds of mA/cm$^2$ or an electrode electric potential of a few tens or few hundreds of mV may be suitably applied, or other conditions suitable to precipitate one or more metal oxides in pores of the template structure. More preferably, a current density of between about 5 and about 500 mA/cm$^2$, or between about 10–250 mA/cm$^2$ is applied to the template. In other preferred methods, an electrode electric potential of between about 5 and about 500 mV, or between about 10–250 mV is applied to the template.

In the step of contacting the composite material with a basic composition such as a preferred sodium hydroxide solution, the sodium hydroxide solution is preferably an aqueous solution which has an alkaline concentration of between about 0.05 M and about 5 M or more preferably between about 0.1 and about 5 M. Typically, the composite of the alumina or polymer template and a precipitated metal oxide are soaked in the sodium hydroxide solution for between 1 minute and 12 hours or more preferably for between about 10 minutes and about 1 hour.

The invention also provides electrodes obtainable or obtained by methods disclosed herein. The invention further provides capacitors that comprises one or more electrodes of the invention as well as various devices such as an electric vehicle, computer, military equipment, communication equipment, etc. that comprise one or more electrodes of the invention.

Other aspects of the invention are discussed below.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

As discussed above, the invention includes methods for manufacturing a nano-structured metal oxide electrode, where preferred methods comprise: (a) providing a template substrate comprising a plurality of nano-sized pores and a current collector; (b) treating the template substrate with a composition comprising one or more depositable metals such as a nickel salt and applying a current or electrode electric potential to thereby deposit one or more metal oxides into pores of the template; and (c) removing the template substrate to provide the metal oxide electrode. As discussed further below, notably, the composition with depositable metal may be at least substantially free of a separate binder material and/or conductive carbon material and the produced electrode is at least substantially free of a separate binder material and/or conductive carbon material.

Hereinafter, such embodiments of the present invention are described in detail with reference to the accompanying drawings.

Figure 1:
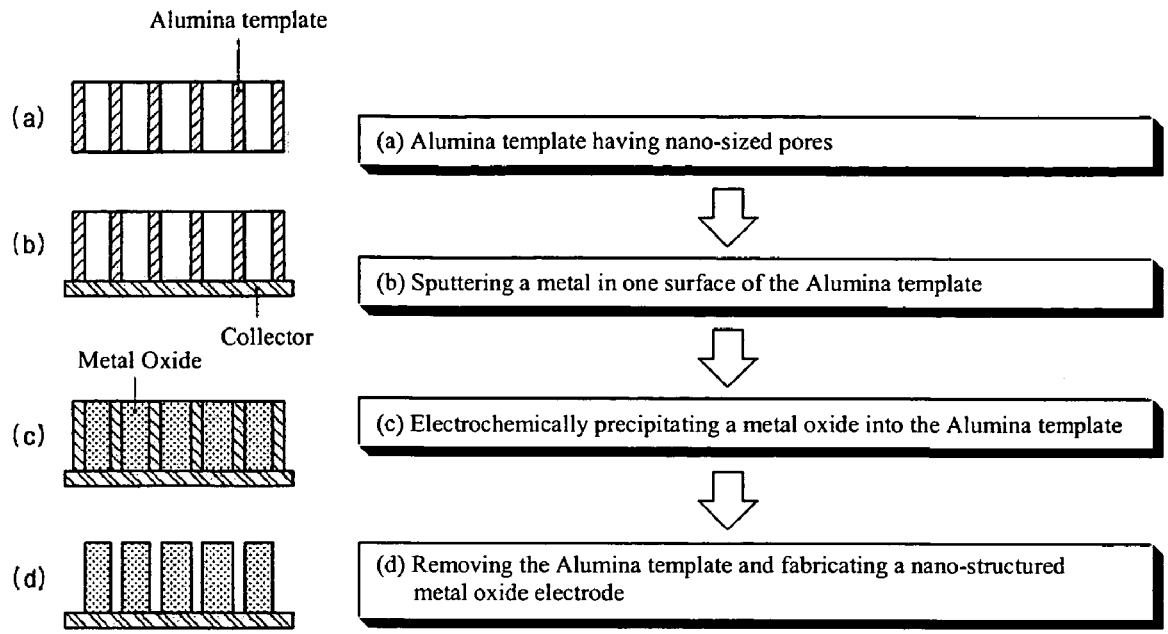
FIG. 1 is a flow chart of a method for manufacturing a nano-structured electrode of a metal oxide according to the present invention.
Figure 2:
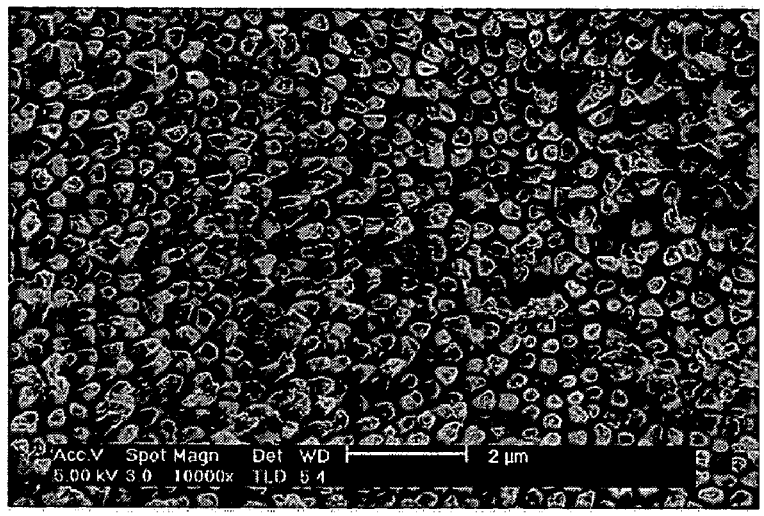
FIG. 2 is an enlarged picture of a nano-structured nickel oxide electrode manufactured according to the present invention.

FIG. 1 is a flow chart of a method for manufacturing a nano-structured metal oxide electrode according to the present invention, and FIG. 2 is an enlarged picture of an exemplary nano-structured nickel oxide electrode according to the present invention.

The present invention provides a nano-structured oxide material for use in a high capacity supercapacitor and methods of making same. The invention further provides a nano-structured metal oxide electrode prepared by the methods of the invention. Thus, the invention provides methods of manufacturing a high capacity supercapacitor which are fabricated using a metal oxide electrode having a high specific capacitance.

Although not wishing to be bound by theory, supercapacitors store an electric charge by a reversible electrochemical reaction at the interface of a metal oxide and an electrolyte. Therefore, to obtain an electrode having a high specific capacitance, it is typically necessary to increase the interfacial surface area between the metal oxide and the electrolyte, thereby increasing electrochemically active reaction sites. The nano-structured metal oxide electrodes of the invention provide increased interfacial surface area and increased specific capacitance. Thus, the nano-structured metal oxide electrodes prepared by the methods of the invention are particularly suited for use in super capacitor applications.

Hereinafter, an exemplary method of fabricating preferred nano-structured metal oxide electrodes to the present invention will be described.

First, a porous alumina or polymer template that has a plurality of pores suitably having a pore diameter of a few tens or hundreds of nanometers (or more preferably between 5 and 500 nm) is prepared. Preferred alumina templates have a pore diameter of between about 20–200 nm. Preferred polymer templates have a pore diameter of between about 20–200 nm. Although preferred alumina and polymer templates are recited herein, other nanoporous templates are also contemplated for use in the methods of the invention. Thus, other preferred nano-porous templates include metals, ceramics, clays, zeolites, and the like, which can be capable of forming an ordered or random nano-porous structure, which can be stable to deposition of a conductive metal by sputtering and metal oxide precipitation, and which can be removed by sodium hydroxide or other suitable base.

In a second step, a metal acting as a current corrector formed in one surface of the alumina template is suitably sputtered onto the polymer or alumina template with a thickness of a few tens of μm using a sputtering apparatus. The current collector metal typically has excellent electrical conductivity, chemical and electrochemical stability to alkali solutions (e.g., sodium hydroxide) and to the conditions used to precipitate the metal oxide.

In a third step, following the sputtering, the alumina or polymer template is contacted with a precipitation solution with one or more depositable metals which suitably may be one or more metal salts dissolved or otherwise dispersed therein. References herein to "dissolved" or "dissolving" or other similar term are inclusive of dispersing the material in a second material such as the metal salt being dispersed in the precipitation solution. Static electricity is suitably applied to the alumina or polymer substrate which is in contact with the precipitation solution. In a static electricity applying step, a current density of a few tens or hundreds of mA/cm$^2$ (or more preferably between 5 and 500 mA/cm$^2$ or between about 5 and 250 mA/cm$^2$) or an electrode electric potential of a few tens or hundreds of mV (or more preferably between 5 and 500 mV or between 10–250 mV) is applied for 1–120 minutes (or more preferably for 10–60 minutes). Application of the static current or electric potential induces precipitation of the metal salt in the pores of the nano-structured alumina or polymer template.

In a fourth step, the composite of the precipitated metal oxide and alumina or polymer template is suitably contacted with a sodium hydroxide solution or other base for between about 1 and 120 minutes. More preferably the composite is submerged into an aqueous sodium hydroxide solution having a concentration of 0.1–5.0 M for between about 10–60 minutes under conditions conducive to removal of the alumina or polymer template.

In a final optional step, after removal of the alumina or polymer template, the nano-structured metal oxide may be suitably dried thereby providing a fabricated nano-structured metal oxide electrode.

Nano-structured metal oxides are fabricated according to the methods provided by present invention. The nano-structured metal oxides prepared by the methods of the invention are suitable for use as electrodes for a variety of applications.

In contrast to conventional manufacturing processes and electrodes prepared by same, the present invention provides nano-structured metal oxide electrodes which consist essentially of the electrode material and the nano-porous metal oxide without a binder. Thus, the nano-porous electrodes of the present invention do not comprise a mixture of an electrode active material, a binder, a carbon conductive material, and the like. Moreover, preferred methods of fabricating a nano-structured metal oxide electrode of the invention do not include the steps of mixing an electrode active material, a binder, a carbon conductive material and then applying the admixture to a current collector. As discussed above, the composition with depositable metal (e.g. dissolved nickel salt) preferably is at least substantially free of a separate binder material and/or conductive carbon material and the produced electrode preferably is at least substantially free of a separate binder material and/or conductive carbon material. A composition with depositable metal that is "substantially free of a separate binder material and/or conductive carbon material" has less than 40 weight percent of a separate binder material and/or conductive carbon material relative to the weight of the one or more depositable metals present in the composition, more preferably a composition with depositable metal that is substantially free of a separate binder material and/or conductive carbon material has less than 30, 20, 10, 5, 4, 3, 2, 1 or 0.5 weight percent of a separate binder material and/or conductive carbon material relative to the weight of the one or more depositable metals present in the composition. Particularly preferred compositions with depositable metal are completely free of a separate binder material and/or conductive carbon material. A electrode that is at least substantially free of a separate binder material and/or conductive carbon material is produced with such a composition, i.e. a composition with one or more depositable metals (e.g. dissolved nickel salts) that has less than 40, 30, 20, 10, 5, 4, 3, 2, 1 or 0.5 weight percent of a separate binder material and/or conductive carbon material relative to the weight of the one or more depositable metals present in the composition. Particularly preferred electrodes are produced with compositions with depositable metal that are completely free of a separate binder material and/or conductive carbon material.

Thus, the electrodes of the instant invention can be directly fabricated by the methods of the invention which enable easy and direct electrochemical measurements of the metal oxide.

The methods of the invention allow for morphology modulation of the nano-structured metal oxide by changing the size and density of nano-sized pores in the alumina and polymer templates. The methods of the invention also provide control over the thickness or length of the nano-structured metal oxide layer on the current collector layer by modulating the electrochemical conditions during metal oxide precipitation, e.g., by varying the applied current density and precipitation time period, the thickness of the nano-structured metal oxide layer can be increased or decreased.

In certain preferred embodiments of the present invention, the method for manufacturing the nano-structured nickel oxide electrode will be described hereunder.

1) preparing an alumina template having a pore diameter of between 20–200 nm;

2) depositing a metal layer having excellent conductivity to a thickness of between 5–50 μm onto a surface of the alumina template using standard sputtering apparatus, wherein the metal is stable during an electrochemical precipitation of a metal oxide, and is also stable in a metal salt solution, and wherein a lateral side of the alumina template is sealed so that area available for electrochemical precipitation of the metal oxide is uniform;

3) The alumina template electrode is submerged in a nickel salt solution having a concentration of between about 0.05 and 0.5 M, and a current density of a few tens or hundreds of mA/cm$^2$ (Preferably between 5–500 or between 10–250 mA/cm$^2$) or an electrode electric potential of a few tens or hundreds of mV (preferably between 5–500 mV or between 10–250 mV) is applied for a few tens of minutes (preferably 10–60 minutes) to precipitate nickel oxide in the nano-structured pores in the alumina template;

4) The composite of the alumina template/nano-structured metal oxide is submerged in a sodium hydroxide solution having a concentration of between about 0.1–5M for about 10 to 60 minutes under conditions conducive to dissolving or otherwise removing the alumina template. The nano-structured metal oxide is dried after removal of the alumina template thereby providing a nickel oxide nano-structured electrode having nickel oxide structures having a dimension of between about 20–200 nm.

As shown in FIG. 2, a nickel oxide nano-structured electrode prepared by a method of the present invention has a plurality of substantially co-parallel nickel oxide columns, each of which has a diameter of from a few tens to a few hundreds of nanometers, e.g., a diameter of between about 10 and about 250 nanometers.

In the present invention, it is possible to easily control the diameter of the nano-structured nickel oxide by adjusting the diameter of the nano-sized pores of the alumina template. In addition, it is possible to easily control the thickness of the nano-structured nickel oxide layer by adjusting the electrochemical variable such as the applied current density and applied time.

As described above, in the method for manufacturing a nano-structured metal oxide electrode according to the present invention, it is possible to easily fabricate a metal oxide electrode having a diameter of from a few tens to a few hundreds of nanometers using the alumina template having nano-sized pores, thereby easily manufacturing an electrode of supercapacitor.

Further, in the present invention, a metal oxide of nano-size is easily fabricated through a simple fabrication process, and it may be directly fabricated in a type of an electrode.

Thus, the present invention provides methods for the direct fabrication of an electrode without inclusion of a binder and/or carbon conductive material, thereby allowing for rapid and direct measurement of the electrochemical properties of the nano-porous metal oxide.

Electrodes of the invention may be employed for a variety of applications, including as a capacitor e.g. to power a vehicle such as a passenger car, truck and the like; to power a communication instrument particularly a portable mobile communication instrument; to power a memory backup of a computer; to power military and/or aerospace equipment; and to power medical equipment.

The invention has been described in detail with reference to preferred embodiments thereof. However, it will be appreciated that those skilled in the art, upon consideration of the disclosure, may make modifications and improvements within the spirit and scope of the invention.

All of the patents and publications cited herein are hereby incorporated by reference.

Those skilled in the art will recognize, or be able to ascertain using no more than routine experimentation, many equivalents to the specific embodiments of the invention described herein. Such equivalents are intended to be encompassed by the following claims.

What is claimed is:

1. A method for manufacturing a nano-structured metal oxide electrode, comprising:
   (i) preparing an alumina or polymer template having a plurality of nano-sized pores;
   (ii) sputtering a metal acting as a current collector having a thickness of a few tens of $\mu m$ in one surface of said alumina or polymer template;
   (iii) contacting the alumina or polymeric template having a current collector deposited thereon with a precipitation solution having a metal salt dissolved therein, and applying a current or electrode electric potential;
   (iv) electrochemically precipitating a metal oxide in the nano-sized pores of said alumina or polymeric template;
   (v) contacting said nano-structure metal oxide composite of the alumina or polymer template and the precipitated metal oxide with a sodium hydroxide solution under conditions conducive to removing the alumina or polymeric template; and
   (vi) drying said nano-sized metal oxide to provide the nano-structured metal oxide electrode.

2. The method of claim 1, wherein said current collector metal sputtered with a thickness of between about 5–50 $\mu m$ and wherein the current collector metal has an excellent electrical conductivity, is stable during an electrochemical precipitation of the metal oxide, and is chemically and electrochemically stable in the presence of the metal salt solution.

3. The method of claim 1, wherein said metal salt dissolved in the precipitation solution contains nickel.

4. The method of claim 1, wherein the current has a current density of about 10–250 of $mA/cm^2$ or electrode electric potential is between about 10–250 mV.

5. The method of claim 1, wherein the nano-structured composite of the alumina or polymer template is contacted with a sodium hydroxide solution having a concentration of about 0.1 M to about 5 M for between about 10 to 60 minutes.

6. A method for manufacturing a nano-structured metal oxide electrode, comprising:
   (a) providing a template substrate comprising a plurality of nano-sized pores and a current collector;
   (b) treating the template substrate with a composition comprising one or more depositable metals and applying a current or electrode electric potential to thereby deposit one or more metal oxides into nano-sized pores of the template;
   (c) removing the template substrate to provide the nano-structured metal oxide electrode.

7. The method of claim 6 wherein the composition comprising one or more depositable metals is at least substantially free of a binder and/or conductive carbon material.

8. The method of claim 6 wherein the one or more depositable metals comprise a nickel compound.

9. The method of claim 6 wherein the electrode electric potential does not contain a binder and/or a carbon conductive material.

10. The method of claim 6 wherein the template substrate is removed by alkaline treatment.

11. The method of claim 6 wherein the nano-structured metal oxide electrode comprises metal oxide structures having a dimension of between about 5 and about 500 nanometers.

12. A metal oxide electrode obtainable by a method comprising:
   (a) providing a template substrate comprising a plurality of nano-sized pores and a current collector;
   (b) treating the template substrate with a composition comprising one or more depositable metals and applying a current or electrode electric potential to thereby deposit one or more metal oxides into nano-sized pores of the template;
   (c) removing the template substrate to provide the metal oxide electrode.

13. The electrode of claim 12 wherein the composition comprising one or more depositable metals is at least substantially free of a binder and/or conductive carbon material.

14. The electrode of claim 12 wherein the one or more depositable metals comprise a nickel compound.

15. The electrode of claim 12 wherein electrode electric potential does not contain a separate binder and/or a carbon conductive material.

16. A capacitor comprising an electrode of claim 12.

* * * * *